United States Patent [19]

Kollberg

[11] 4,100,364
[45] Jul. 11, 1978

[54] DC ELECTRIC ARC FURNACE MELT CONNECTION

[75] Inventor: Sten Kollberg, Västerås, Sweden

[73] Assignee: ASEA Aktiebolag, Västerås, Sweden

[21] Appl. No.: 790,939

[22] Filed: Apr. 26, 1977

[30] Foreign Application Priority Data

May 7, 1976 [SE] Sweden .................................. 7605217

[51] Int. Cl.² .............................................. H05B 7/02
[52] U.S. Cl. ..................................................... 13/9 R
[58] Field of Search ............................ 13/9, 11, 18, 1

[56] References Cited

U.S. PATENT DOCUMENTS

| | | |
|---|---|---|
| 3,835,230 | 9/1974 | Valchev et al. ............................ 13/9 |
| 3,997,712 | 12/1976 | Stenkvist .................................... 13/9 |
| 3,999,000 | 12/1976 | Stenkvist .................................... 13/9 |

FOREIGN PATENT DOCUMENTS 1,398,881  6/1975  United Kingdom ..................... 13/11

*Primary Examiner*—R. N. Envall, Jr.
*Attorney, Agent, or Firm*—Kenyon & Kenyon, Reilly, Carr & Chapin

[57] ABSTRACT

A DC electric arc furnace melt connection of the type formed by a metal connector with an inner end melted by the melt and an outer end kept solid by cooling, extends from the furnace hearth at a declination straight and free from curvature and with a uniform and constant cross-sectional area from end to end having a rectangular oblong cross sectional shape with the long sides extending in a horizontal direction. The purpose is to reduce the flow currents normally formed by gas bubbles and electrodynamic effects within the melted portion of the connector and which cause the melted part to wipe over the unmelted part of the connector with the undesirable result of promoting heat exchange between the two parts.

4 Claims, 4 Drawing Figures

DC ELECTRIC ARC FURNACE MELT CONNECTION

BACKGROUND OF THE INVENTION

In a DC electric arc furnace the melt in the furnace hearth is connected with the arc power source, usually anodically, to power the arc formed between the melt and an arcing electrode which is also connected to that power source, usually cathodically, to thereby power the arc.

For the melt connection the prior art has proposed the use of an elongated metal connector having inner and outer ends and a refractory enclosure for that connector and exposing its inner end for contact with and melting by the melt in the furnace hearth, cooling means being provided externally of the hearth for cooling the connector between its inner and outer ends for removing heat from the connector at a rate preventing it from melting throughout its length to its outer end. This permits the power connection to be made to that outer end.

In very rudimentary forms, the general concept of DC arc furnace melt connections have been suggested by the Bowman U.S. Pat. No. 3,789,127 and the Valchev et al U.S. Pat. No. 3,835,230, nether of which disclose any details required for practical commercial applications. Such details are disclosed by the Stenkvist U.S. Pat. No. 3,997,712 and by the Anderson Patent Application Ser. No. 744,423, both assigned to the assignee of the present application.

The Stenkvist patent discloses the refractory enclosure for the metal melt connector as comprising a unit on the outside of the hearth, specifically exemplified as having a curvature permitting the outer end of the metal connector to be positioned above the melt level of the furnace hearth. The Anderson patent application describes a simplification wherein the melt connector with its refractory enclosure is made to extend vertically downwardly from the melt in the furnace hearth with the advantage, among others, that if carbon-oxide gases form in the molten part of the melt connector, these gases can escape upwardly into the melt in the hearth so as to become lost in the furnace atmosphere above the melt. In this way such gases are prevented from becoming entrapped in the molten part of the melt connector and possibly introducing an explosion hazard.

It is desirable for the melt connector and its refractory enclosure to be made as short as is compatible with keeping the outer end portion of the connector safely unmelted. One important factor that must be considered is the rate of heat exchange via the interface formed between the melted and unmelted portions of the melt connector.

SUMMARY OF THE INVENTION

According to the present invention, the elongated metal connector and its refractory enclosure forming a duct filled by the connector, extend from the inner ends of the connector and duct which are exposed to the furnace melt, at a declination straight and free from curvature and with the connector and duct having a uniform and constant cross-sectional area from end to end, both having a rectangular oblong cross-sectional shape with the long sides of this shape extending in a horizontal direction. Preferably the long sides of the oblong shape are at least about twice as long as the narrow sides and the angle of declination of the connector and duct ranges from 50° to 80° with respect to a vertical direction.

The declination of the connector and its duct, forming an acute angle with a vertical direction, causes the previously mentioned carbon-oxide gases, which have now been found to form bubbles in the melted portion of the connector, to accumulate as bubbles at or adjacent to the upper interface formed by the melt connector and its duct, these bubbles flotationally rising by sliding on the declined duct's top surface, to the inner end of the melt connector where they enter the melt in the furnace to which the connector transmits electric power. In the case of the previously mentioned vertical connector the bubbles have been found to rise at a much faster rate and strongly promote a wiping action at the interface between the connector's molten part and its solid part, undesirably increasing the rate of heat exchange at the interface between these parts as compared to the rate that would exist if the molten connector part could exist in a static condition.

The melted portion of the connector has been found to be electrodynamically stirred if the current density varies throughout its length, a condition which also can cause the molten connector part to wipe over its unmelted part. This action is reduced or eliminated because the cross-sectional area of the connector and duct of this invention, does not vary but is constant from end to end of the connector and its duct. Electrodynamic stirring unavoidably occurs at the inner end where the connector of small size meets the melt of much larger size, but it decreases successively from the inner end down to the unmelted portion of the connector.

Finally, because of the narrow, almost strip-like shape of the connector and its duct, there is a mechanical obstruction to any remaining tendency for the melted part of the melt connector, to flow.

By proper design, based on the maximum current density which the melt connector is intended to carry, with the use of the foregoing principles, the rate of flow of the molten connector relative to its solid portion can be made so low that the heat transfer ratio at the interface of the two parts approaches and possibly attains the minimum rate that can be expected to be obtainable if the melted part of the connector could be a completely static body of molten metal.

Because of the foregoing it is possible to make the metal connector and its refractory enclosure shorter and more compact than would otherwise be possible.

BRIEF DESCRIPTION OF THE DRAWINGS

Specific examples of the present invention are illustrated by the accompanying drawings in which.

DETAILED DESCRIPTION OF THE INVENTION

Figure 1:
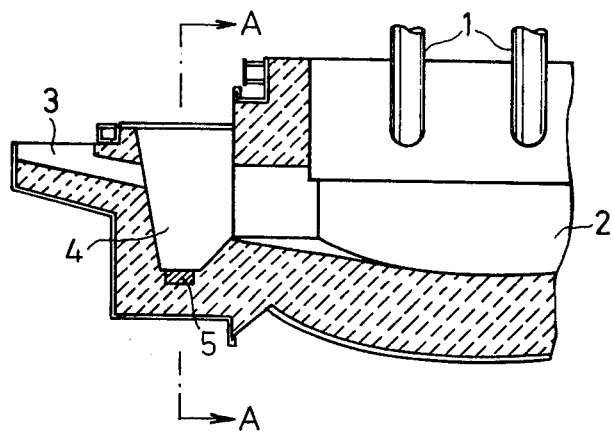
FIG. 1 is a vertical section of the pouring side of a tilting DC electric furnace.
Figure 2:
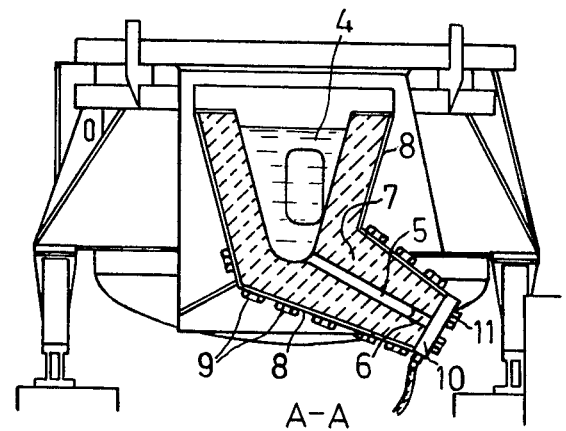
FIG. 2 is a cross section taken on the line A—A in FIG. 1.

FIG. 1 shows only the pouring or tapping side of a tilting DC electric arc furnace having two cathodic graphite arcing electrodes 1 for forming an arc with a melt in the furnace hearth 2, the melt itself being unillustrated. The spout 3 is used for tapping the furnace when it is tilted to the left. A side melt pocket 4 extends horizontally from the pouring spout so as to receive a portion of a melt when it is in the hearth 2 and it is from the bottom of this pocket 4 that the melt connector extends with, as shown by FIG. 2, an extensive inner portion 5 in a molten condition and an outer connection end solidified as indicated at 6, the connector being within the duct formed by the connector being embedded in refractory furnace lining material 7 initially rammed around the connector during its installation, within a metal casing 8 provided externally with the water-cooling indicated at 9. At its outer solid end the connector has an electric power terminal 10, also water-cooled as indicated at 11. In FIG. 2 the pocket 4 is shown as being filled by a part of the furnace melt. If this melt is an iron or steel melt, the connector would also be made of iron or steel, the terminal 10 customarily being made of copper because of its high electrical and thermal conductivity.

The refractory projection encasing the melt connector is illustrated as being externally outwardly tapered, providing an increasingly faster rate of heat abstraction by the water-cooling 9, to the outer end of the installation.

Figure 3:
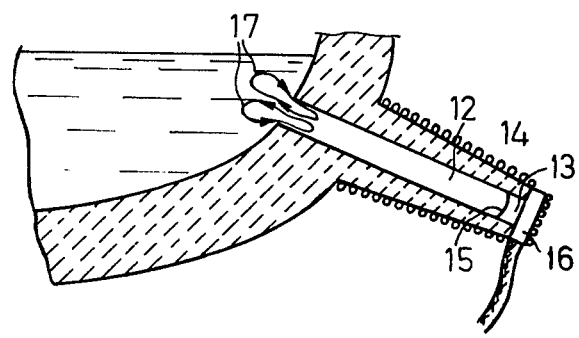
FIG. 3 in vertical section shows a modification of FIGS. 1 and 2.

FIG. 3 shows a modification wherein the melt connector having the molten part 12 and solid part 13 extend directly from a furnace hearth with the necessary refractory projection or encasement again having water-cooling, as indicated at 14, and with the connector provided with the water-cooled copper terminal 16.

In all cases the previously described straightness and declination is shown. The declining angularity is preferably in the range of from 30° to 80° C with respect to a vertical direction.

Figure 3A:
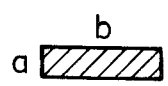
FIG. 3a in cross section shows the oblong rectangular contour of the connector of the present invention.

Furthermore, the cross-sectional area of the connector and duct are shown as being constant from end to end, the cross-sectional area of the current path being inevitably enlarged at the inner end of the connector where it meets the much larger volume of the melt, where unavoidably the well-known pinch effect does induce a flowing condition as indicated by the arrows 17. Finally, as shown by FIG. 3a, the melt connector is made with the rectangular oblong shape having the narrow sides A and the much longer or wider sides B and which shape is oriented with the sides B horizontal.

Because this new melt connector arrangement involves a flat bar shape it may be inexpensively produced as a rolled billet, no problem of curvature being involved such as might require further working.

When the connector is made and installed as described, and with proper design with respect to the current density to be carried, the previously described advantages are obtained. The molten part of the billet forming the connector, remains substantially free from any stirring or wiping action at the interface between this molten part 5–12 and the unmelted part 6–13. Such an interface is indicated at 15 in FIG. 3.

When during working of a steel melt in the furnace, oxide additions are made for eliminating carbon, carbon-oxide gases are formed in the melt. The flow at the inner end of the connector indicated at 17 and caused by the pinch effect, can possibly drag these gases down in the melted connector part 5–12 to where this part is cooled at or adjacent to the unmelted part 6–13. This cooling decreases the solubility of the carbon-oxide gases which then form bubbles. If the connector is vertically oriented, these bubbles flow upwardly so fast as to stir the melted connector part down to the interface between the melted and unmelted connector parts. Their ascent is slowed substantially by the declination of this new connector, because the bubbles must slide upwardly in contact with the top of the connector's duct. Because the duct's top is straight and free from curvature, the carbon-oxide gases are not entrapped anywhere.

What is claimed is:

1. An electric arc furnace comprising a hearth having an inside and outside for containing a melt on its inside, an electrode positioned to form an arc between the electrode and a melt in the hearth when the electrode and melt have connections with an electric power source, an electric melt connection comprising at least one elongated metal connector having inner and outer ends and a refractory enclosure exposing the inner end for contact with and melting by a melt in said hearth, and cooling means for cooling the connector at least between its inner and outer ends for removing heat therefrom at a rate preventing the connector from melting throughout its length to its outer end, said refractory enclosure forming a duct containing said connector and the duct and connector extending at a declination straight and free from curvature from the hearth's said inside at least to the part of the connector prevented from melting by said cooling means.

2. The furnace of claim 1 in which said declination is within the range of from about 30° to about 80° with respect to a vertical direction.

3. The furnace of claim 1 in which said connector has a uniform and constant cross-sectional area throughout its length between its inner and outer ends.

4. The furnace of claim 1 in which said connector has a rectangular oblong cross-sectional shape having long and short sides with the long sides extending in a horizontal direction and the short sides extending in a vertical direction.

* * * * *